May 20, 1930. H. SCHULTZ 1,759,327
APPARATUS FOR MACHINING WELDED RAIL JOINTS
Filed July 24, 1929
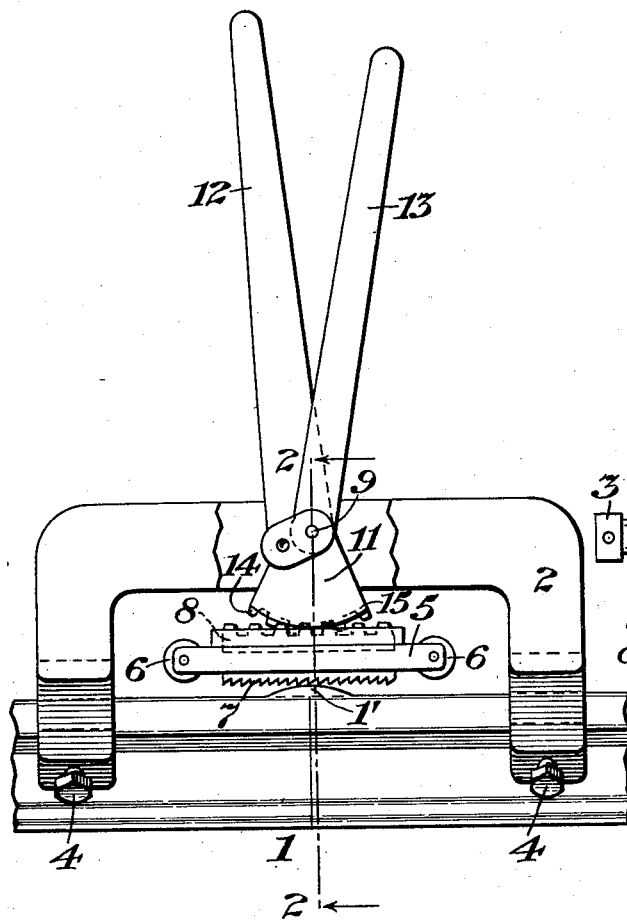
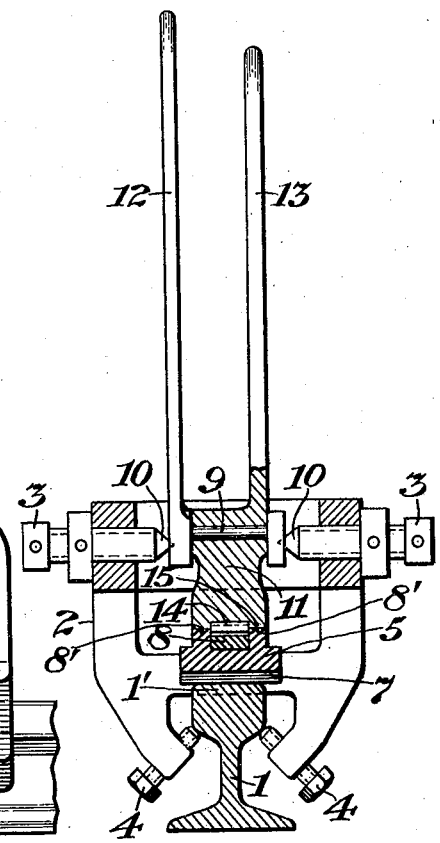
INVENTOR
Hermann Schultz
BY
HIS ATTORNEY Patented May 20, 1930

1,759,327

UNITED STATES PATENT OFFICE

HERMANN SCHULTZ, OF BERLIN-LANKWITZ, GERMANY

APPARATUS FOR MACHINING WELDED RAIL JOINTS

Application filed July 24, 1929, Serial No. 380,746, and in Germany August 17, 1928.

The invention relates to a device for machining welded rail joints for the purpose of reducing and removing the projecting portion of the welding collar on the tread surface of the rails and, to this end, the apparatus, in a preferred form of the invention, involves a frame adapted to be clamped firmly to the rails at the joint, a rock lever pivoted intermediate its ends in the upper part of the frame and having on its lower end a toothed segment to engage a rack on the upper face of a slide, the lower face of which latter is provided with a cutting tool of a suitable form to remove the projecting portion of the welding collar from the rail tread as the lever is swung backward and forward on its pivot, the pivotal axis of said lever being adjustable toward and from the tread surface of the rail, and preferably being in the form of a transverse shaft carried by a second lever, which is pivoted at its lower end to centering studs carried by the frame, so that the pivotal axis of the first or tool operating lever is eccentric to the pivotal axis of the second lever, which latter is moved backward and forward to advance and retract the axis of the first lever toward and from the rail, thereby imposing and releasing pressure on the cutting tool in the operative and return strokes, respectively, of the latter.

The invention is illustrated in the accompanying drawings, in which:—

Fig. 1 is a side elevation of the device, broken away at the center of the frame.

Fig. 2 is a sectional elevation on line 2—2 of Fig. 1.

Referring to the drawings, 1 indicates the rails which have been welded, the welding operation leaving a collar section 1′ projecting above the tread surface of the rails, which collar section must be removed by appropriate tools. A generally yoke-shaped frame 2, having end sections adapted to straddle the welded rails on either side of the joint and to be clamped rigidly to the rails by bolts 4, carries two oppositely disposed studs or bolts 3 provided with coned ends 10 between which is pivoted the lower end of a lever 12 having a cross shaft or pin 9, which is eccentric to the pivotal axis of said lever, defined by the bearing pins 3. Pivoted intermediate its upper end 13 and its lower end 14 on said cross shaft or pin 9 is a rock lever 11, the lower end of which is finished with two lateral plane segments 15 and an intermediate toothed segment 14.

A sliding frame or block 5 carries on its lower face a suitable cutting or abrading tool 7 adapted to be reciprocated over the collar extension 1′ on the tread surfaces of the rails, the slide 5 being provided at its ends with wheels 6 which engage the tread surfaces of the rails after the projection 1′ has been reduced or removed, thereby preventing the tool cutting below the normal tread surface. The upper face of the slide carries two plane tracks or guides 8′ which are adapted to be engaged by the plane segments 15 of the lever 11, and disposed between said tracks or guides is a rack 8 which is engaged by the toothed segment 14 of the lever 11.

The operation of the device is as follows: When the frame 2 has been clamped in position to span the welded joint and the slide 5 has been engaged with the projecting portion 1′ of the welding collar, the lever 11 is oscillated to reciprocate the tool carrying slide. Before each movement of said lever 11 to effect a working stroke of the cutting tool, the lever 12 is swung on its pivot to lower the pivotal axis 9 of the lever 11 toward the rails and thereby impose sufficient pressure on the tool to effect the cutting operation. Before the lever 11 is swung in the opposite direction to effect the return movement of the cutting tool, the lever 12 is also swung in opposite direction to elevate the pivotal axis 9 of the lever 11 and relieve the pressure on the cutting tool. This alternating movement of the two levers is continued by the workman until the projecting portion 1′ of the welding collar has been reduced to the plane of the tread surfaces of the rails, at which time the wheels 6 carried by the slide 5 engage the tread surfaces to prevent further cutting action.

From the foregoing, it will be apparent that the upper projection of the welding collar above the tread surface of the rail may be quickly reduced by the workman standing opposite the rail joint and operating the levers 11 and 12 alternately, as described, and that he may accurately regulate the degree of the downward pressure applied to the cutting tool by the extent of the movement of the lever 12 before and during the stroke of the lever 11, which effects the cutting stroke of the tool, and then, by reversing the movement of the lever 12, the imposed pressure on the tool is relieved and the reverse or non-working stroke of the latter may be made without imposing any undue wear on the cutting face of said tool.

What I claim is:

1. Apparatus for machining welded rail joints, comprising a frame adapted to be clamped to the rails, a lever pivoted in said frame intermediate its ends, a cutting tool engaging the top of the rails, and connections between the lever and tool for reciprocating the latter.

2. Apparatus for machining welded rail joints, comprising a frame adapted to be clamped to the rails, a lever pivoted in said frame intermediate its ends, a cutting tool engaging the top of the rails, connections between the lever and tool for reciprocating the latter, and means for varying the pivotal axis of the lever relative to the top of the rails.

3. Apparatus for machining welded rail joints, comprising a frame adapted to be clamped to the rails, a lever pivoted intermediate its ends in said frame and having a toothed segment on its lower end, a slide having a rail engaging cutting tool on its bottom face and a rack on its upper face engaging said segment, and means for varying the pivotal axis of the lever relative to the top of the rails.

4. Apparatus for machining welded rail joints, comprising a frame adapted to be clamped to the rails, a lever pivoted intermediate its ends in said frame and having lateral plane segments and an intermediate toothed segment on its lower end, a slide having a rail engaging cutting tool on its bottom face and lateral tracks and an intermediate rack on its upper face engaging the plane segments and the toothed segment of the lever respectively, and means for varying the pivotal axis of the lever relative to the top of the rails.

5. Apparatus for machining welded rail joints, comprising a frame adapted to be clamped to the rails, a lever pivoted at its lower end in said frame and having a shaft eccentric to its pivotal axis, a rock lever pivoted intermediate its ends on said eccentric shaft and having a toothed segment on its lower end, and a slide having a rail engaging cutting tool on its bottom face and a rack on its upper face engaging said segment.

6. Apparatus for machining welded rail joints, comprising a frame adapted to be clamped to the rails, a lever pivoted at its lower end in said frame and having a shaft eccentric to its pivotal axis, a rock lever pivoted intermediate its ends on said eccentric shaft and having lateral plane segments and an intermediate toothed segment on its lower end, and a slide having a rail engaging cutting tool on its bottom face and lateral tracks and an intermediate rack on its upper face engaging the plane segments and the toothed segment of said rock lever respectively.

7. Apparatus for machining welded rail joints, comprising a frame adapted to be clamped to the rails, a lever pivoted at its lower end in said frame and having a shaft eccentric to its pivotal axis, a rock lever pivoted intermediate its ends on said eccentric shaft and having lateral plane segments and an intermediate toothed segment on its lower end, a slide having a rail engaging cutting tool on its bottom face and lateral tracks and an intermediate rack on its upper face engaging the plane segments and the toothed segment of said rock lever respectively, and wheels mounted on said slide to engage the tread surfaces of the rails to prevent the cutting tool operating below the plane of said surfaces.

8. Apparatus for machining welded rail joints, comprising a frame adapted to be clamped to the rails, a lever pivoted at its lower end in said frame and having a shaft eccentric to its pivotal axis, a rock lever pivoted intermediate its ends on said eccentric shaft and having a toothed segment on its lower end, a slide having a rail engaging cutting tool on its bottom face and a rack on its upper face engaging said segment, and means on said slide to engage the tread surfaces of the rails to prevent the cutting tool operating below the plane of said surfaces.

In testimony whereof I affix my signature.

HERMANN SCHULTZ.